(12) United States Patent
Jensen

(10) Patent No.: US 8,919,038 B2
(45) Date of Patent: Dec. 30, 2014

(54) IRRIGATION SYSTEM AND METHOD

(75) Inventor: Jarl Jensen, Nyack, NY (US)

(73) Assignee: Inventagon LLC, Nyack, NY (US)

( * ) Notice: Subject to any disclaimer, the term of this patent is extended or adjusted under 35 U.S.C. 154(b) by 431 days.

(21) Appl. No.: 13/194,634

(22) Filed: Jul. 29, 2011

(65) Prior Publication Data
US 2012/0031505 A1    Feb. 9, 2012

Related U.S. Application Data

(60) Provisional application No. 61/371,395, filed on Aug. 6, 2010, provisional application No. 61/467,055, filed on Mar. 24, 2011.

(51) Int. Cl.
*A01G 27/06*      (2006.01)
*A01G 31/02*      (2006.01)

(52) U.S. Cl.
CPC ..................................... *A01G 31/02* (2013.01)
USPC .......................................................... 47/48.5

(58) Field of Classification Search
CPC ..... A01G 29/00; A01G 31/02; A01G 27/006; A01G 27/02
USPC .............. 47/48.5, 59 R, 62 R, 62 E, 62 N, 63
See application file for complete search history.

(56) References Cited

U.S. PATENT DOCUMENTS

| | | | |
|---|---|---|---|
| 3,924,353 A | 12/1975 | Figari | |
| 4,065,926 A | 1/1978 | Brandt | |
| 4,130,245 A * | 12/1978 | Bryson | 239/34 |
| 4,140,421 A * | 2/1979 | Lloyd | 405/43 |
| 4,955,158 A * | 9/1990 | Lyon | 47/81 |
| 4,970,823 A | 11/1990 | Chen et al. | |
| 5,611,369 A * | 3/1997 | Hamann, Jr. | 137/561 A |
| 5,816,742 A * | 10/1998 | Cordewener | 405/43 |
| 5,839,659 A | 11/1998 | Murray | |
| 6,079,156 A | 6/2000 | Colovic | |
| 6,293,477 B1 * | 9/2001 | Chambers | 239/542 |
| 6,606,823 B1 * | 8/2003 | McDonough et al. | 47/65.9 |
| 6,712,552 B1 | 3/2004 | Kepler et al. | |
| 6,766,817 B2 | 7/2004 | da Silva | |
| 6,830,203 B2 | 12/2004 | Neyestani | |

(Continued)

OTHER PUBLICATIONS

International Preliminary Report on Patentability for International (PCT) Patent Application No. PCT/US2011/046541, mailed Feb. 21, 2013, 6 pages.

(Continued)

*Primary Examiner* — Rob Swiatek
*Assistant Examiner* — Ebony Evans
(74) *Attorney, Agent, or Firm* — Sheridan Ross P.C.

(57) ABSTRACT

Systems and methods for providing irrigation to plants are provided. The system generally includes a fluid distribution structure having a barrier layer and a hydrophilic layer. The fluid distribution structure can additionally include a plurality of channels. Each channel can be associated with a nonwoven material or other volume providing element overlayed by a filter layer. A fluid supply tube may be provided at a first end of the fluid distribution structure, and a drainage tube may be disposed along a second end of the fluid distribution structure. Where the fluid distribution structure includes channels, a supply tube and a drainage tube, the channels generally extend between the supply tube and the drainage tube. Fluid collected by the drainage tube can be recirculated to the supply tube, or can be collected or disposed of.

26 Claims, 10 Drawing Sheets

(56) References Cited

U.S. PATENT DOCUMENTS

| | | |
|---|---|---|
| 6,918,404 B2 | 7/2005 | Dias da Silva |
| 6,959,882 B1 | 11/2005 | Potts |
| 6,996,932 B2 | 2/2006 | Kruer et al. |
| 6,997,402 B2 | 2/2006 | Kruer et al. |
| 7,152,370 B2 * | 12/2006 | Caron et al. .................. 47/82 |
| 7,392,614 B2 | 7/2008 | Kruer et al. |
| 7,416,643 B2 * | 8/2008 | Yonover .................. 202/234 |
| 7,647,724 B2 | 1/2010 | Caron et al. |
| 7,681,356 B2 | 3/2010 | Sheldrake et al. |
| 7,870,691 B2 * | 1/2011 | Williams et al. .............. 47/65.9 |
| 8,001,721 B2 * | 8/2011 | Okamoto et al. .............. 47/21.1 |
| 8,104,247 B2 * | 1/2012 | Hasse .................. 52/746.11 |
| 8,479,443 B2 * | 7/2013 | Buist .................. 47/65.9 |
| 2010/0005716 A1 * | 1/2010 | Byles .................. 47/48.5 |
| 2010/0043285 A1 | 2/2010 | Kelty |

OTHER PUBLICATIONS

International Search Report for International (PCT) Application No. PCT/US11/46541, mailed Dec. 6, 2011, 2 pages.

Written Opinion for International (PCT) Application No. PCT/US11/46541, mailed Dec. 6, 2011, 4 pages.

* cited by examiner

IRRIGATION SYSTEM AND METHOD

CROSS REFERENCE TO RELATED APPLICATION

This application claims priority under 35 U.S.C. §119(e) to U.S. Provisional Patent Application Ser. Nos. 61/371,395 filed Aug. 6, 2010 and 61/467,055 filed on Mar. 24, 2011, each of which is incorporated herein in their entirety by reference.

FIELD

The present disclosure is related to irrigation systems, including systems for horticulture and grass irrigation.

BACKGROUND

Hydroponics is the practice of growing plants in a medium other than soil, using mixtures of essential plant nutrient elements dissolved in water. It is derived from two Greek words, "hydro" (water) and "ponos" (working), thus water-working. Hydroponics has been identified as the best technology for crop production, not only for urban and health-conscious societies, but also for land, labor and resource-scarce societies and remote communities around the world. Because of hydroponics, it is now technically feasible to obtain a fresh supply of vegetables, flowers, herbs, etc. on top of Mt. Everest, deep under the sea in submarines, in remote deserts, in drought prone areas and even in space stations.

Hydroponics was practiced in the BC in Egypt, China and India where ancient man used dissolved manure to grow cucumbers, watermelons and other vegetables in sandy river beds (aggregate hydroponics—sand culture). It was then referred to as Riverbed Cultivation. Later, when Plant Physiologists started to grow plants with specific nutrients for experimental purposes, they used the name nutri-culture. Then, terms like water culture, solution culture, and gravel bed culture etc. were mentioned. The chronology of events is given in Table 1. Though crop production has been practiced for centuries, serious work on the hydroponic methods of growing crops began only in the 1920s. The basics of commercial hydroponics were developed in the 1940s and marketed in the 1960s. Currently, there are numerous commercial hydroponic farms in many parts of the world. Apart from the government research institutions, many small and multinational companies in Australia, Belgium, Denmark, Holland, Japan, Taiwan and the U.S. have invested a lot in commercializing this technology. Horticulture, Plant Physiology and Hydroponics Labs around the world are working hard on refining this futuristic green technology. Now, hydroponics is the standard name for all cultivation methods that use nutrient solutions.

TABLE 1

History of Hydroponics

| Year | Development |
|---|---|
| BC | Compost/manure solution used to grow melons and other vegetables in the riverbeds during summer in Arabia, Babylon, China, Egypt, India and Persia |
| 1492 | Plants need mineral elements (Leonardo de Vinci - France) |
| 1666 | Plants grown in water in glass vials (Robert Boyle - Ireland) |
| 1699 | Nutrients absorbed by ion exchange (Woodword - England) |
| 1804 | Studies on crop nutrition (Nicolas de Saussure - France) |
| 1850 | Sand/quartz/charcoal culture (Jean Baussingault - France) |
| 1860 | Water/solution culture (Sachs and Knop - Germany) |
| 1920 | Formulating nutrient solution (Hoagland - USA) |
| 1940 | Nutriculture studies (Withers and Withers - USA) |
| 1945 | Nutrient film technique (Alan Cooper - UK) |
| 1960 | Aeroponics (Massantini - Italy). |
| 1970 | Floating hydroponics (Farnworth - USA) |
| 1975 | Raceways hydroponics - deep flow technique |
| 1980 | Many automated and computerized hydroponics farms established around the world |
| 1990 | Home hydroponics kits gained popularity in Australia, Japan, Singapore and Taiwan |

There are seven modern hydroponic techniques. In the Ebb and Flow Technique (EFT), as illustrated in FIG. 1, the nutrient solution is drained off 3-4 times a day to permit the roots to breathe. It is also called the "Flood and Drain Technique", and is good for home gardens and nurseries. The second technique, illustrated in FIG. 2, is the "Deep Flow Technique" (DFT) where the depth of nutrient solution (several inches deep) is circulated around the roots by a pump and gravity drain. This method is also referred to as "Dynamic Root Floatation" or "Raceway Hydroponic" technique, and is ideal for leafy vegetables. FIG. 3 illustrates the technique known as the "Aerated Flow Technique" (AFT), a modified version of DFT. Here, the nutrient solution is profusely aerated by special mechanisms. Another technique similar to AFT is the Japanese "Kyowa Technique." It is excellent for growing both leafy and fruit crops. The fourth technique, as illustrated in FIG. 4, is the "Nutrient Film Technique" (NFT), where a thin film of nutrient solution flows continuously down the sloped troughs to bathe the roots. FIG. 5 illustrates the "Drip Irrigation Technique" (DIT), where plants are grown in inert or organic substrates. The nutrient solution is fed closely around the roots 6-7 times a day in drops or trickles. Deserts in the Middle East are exporting crop production because of this technique. It is also suitable for plantation, orchard and landscaping industries. The sixth is the "Root Mist Technique" (RMT), illustrated in FIG. 6, where a mist of nutrient solution is sprayed constantly onto the roots of plants suspended from a frame in the top. This technique is known as "Aeroponics". It is good for initiating rooting of cuttings and for providing optimum oxygen levels to the root zone. FIG. 7 illustrates the seventh technique, the Fog Feed Technique (FFT). It is similar to RMT but the droplet size is so minute that nutrient solution can barely moisten your hand. This technique has yet to be perfected. It is good for plants with aerial roots (i.e. orchids, anthuriums, etc.).

The main advantages of hydroponics include: higher crop yields; smaller space requirements; freedom from diseases; less labor; no weeding; higher growth rate; tendency to uniform results; and better control of pH and nutrient application. The main disadvantages include: high initial capital costs due to the use of tanks, pumps, lights, pipes, etc.; and high requirements for operational and technical skills.

All plants need 16 elements to grow—C, H, O, N, P, K, Ca, Mg, S, Zn, Cu, Fe, Mn, B, Mo and Cl. In nature, the plants derive these elements from the atmosphere or minerals in the soil. Most of the elements used in preparing nutrient solutions are derived from these naturally occurring minerals. Hydroponic aqueous solutions purity can be controlled unlike the soil culture that may contain impurities. There are numerous formulations of nutrient solutions available in the market. These formulations are based on the availability and price of the raw materials. Some are in solid form such as nutrient salts or fertilizers, some in liquid form and some in tablet form. Their composition depends on the raw materials and the intended purpose. Normally, nutrient solution for vegetative growth will have more nitrogen and less potassium and those for flowering and fruiting phase will have less nitrogen and more potassium.

Hydroponics is considered to be another technology to overcome food shortage in the future, especially in land, labor and resource scarce societies. It has the potential of being the best technology for certain photochemical from plant roots, especially by the pharmaceutical industries. When land, labor and natural resources become scarce and people look for healthy alternatives to farming and gardening, there is no choice but to turn to hydroponics.

Thus, there is a need for an irrigation system and method that provide an aqueous solution, which can include water and nutrients, to large and small fields alike.

SUMMARY

The present disclosure is directed to irrigation systems and methods for use in various agricultural or landscaping purposes, including but not limited to golf courses and the large scale field farming of crops, such as grass, wheat, vegetables, fruits, flowers, herbs and rice. The disclosed invention is capable of supplying an irrigation fluid, which can include precisely formulated nutrient solutions, to entire fields of crops. Initially, the field is covered with a barrier layer that decreases or blocks the flow of fluid to the ground below the irrigation system. A hydrophilic layer allows and promotes fluid movement within the irrigation system. In some embodiments, the hydrophilic layer may be treated such that the top layer of the system acts as a root guard or filter. In still other embodiments, the hydrophilic layer may be treated with or overlaid by a root guard material to prevent roots from penetrating the system.

Additional layers may also be used in the system. For example, embodiments of the disclosed invention can include the barrier layer, the hydrophilic layer, a non-woven layer that assists in providing a shape or volume to the system and a filter layer. Alternatively or in addition, a plurality of fluid distribution channels can be included.

The system may also include a fluid supply tube to provide fluid to the system and/or a fluid drainage tube which removes fluid from the system. The fluid supply tube can be disposed along an edge or an intermediate line of the system that corresponds to or follows along a contour line of a field comprising a high point or ridge. The fluid drainage tube can be disposed along an edge or an intermediate line of the system that corresponds to or follows along a contour line of a field comprising a low point or a depression. The fluid drainage tube may recirculate fluid to the fluid supply tube or may direct excess fluid to containers for storage or disposal. The fluid drainage tube may also remove excess fluid from the soil above the system and may also assist in aerating the field.

Multiple irrigation systems may be joined together to cover a field of any shape or size. Additionally, the irrigation system may be deployed to the field by rolling the system onto the field.

In another embodiment, a hydro gel or superabsorbent polymer (SAP) may be used with the system. Superabsorbent polymers readily absorb aqueous solutions through hydrogen bonding with the water molecule. A SAP's ability to absorb water is a factor of the ionic concentration of an aqueous solution. The total absorbency and swelling capacity are controlled by the type and degree of cross-linking to the polymer. Low density cross-linked polymers generally have a higher absorbent capacity and swell to a larger degree while high cross-link density polymers exhibit lower absorbent capacity and swell. In certain embodiments, the SAP can absorb and retain the nutrients with decreased loss.

In some embodiments, an included layer may be treated or chosen to be resistant to rotting and deterioration.

In another embodiment, the system can be used to reclaim land that has deteriorated due to soil erosion or landslides. Because the system is able to grow greenery, such as grass and shrubs, the system may have a more natural look while reclaiming the land.

Additional features and advantages of embodiments of the present invention will become more readily apparent from the following description, particularly when taken together with the accompanying drawings.

DETAILED DESCRIPTION

Figure 1:
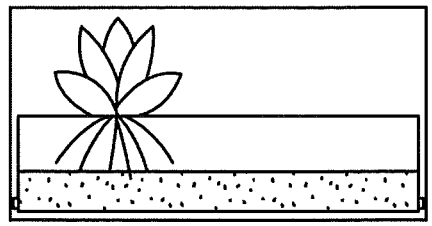
FIG. 1 illustrates the Flow Technique (EFT)
Figure 2:
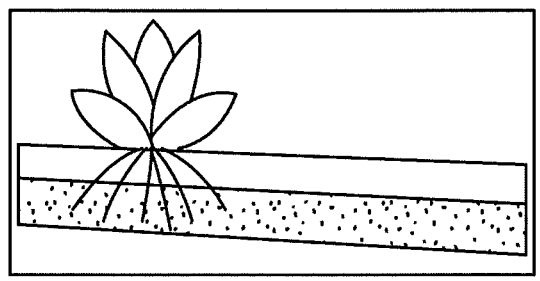
FIG. 2 illustrates the Deep Flow Technique (DFT)
Figure 3:
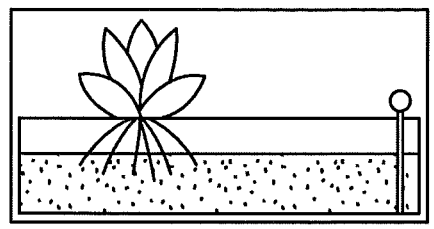
FIG. 3 illustrates the Aerated Flow Technique (AFT)
Figure 4:
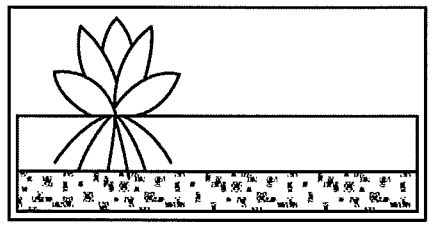
FIG. 4 illustrates the Nutrient Film Technique (NFT)
Figure 5:
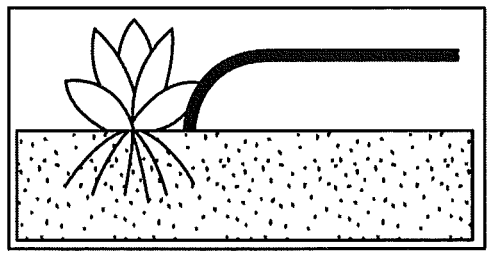
FIG. 5 illustrates the Drip Irrigation Technique (DIT)
Figure 6:
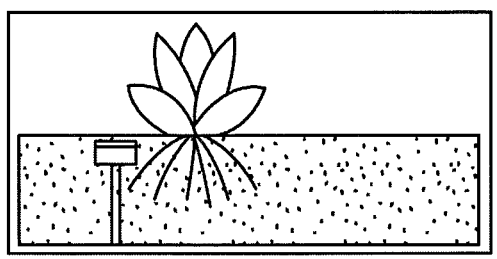
FIG. 6 illustrates the Root Mist Technique (RMT)
Figure 7:
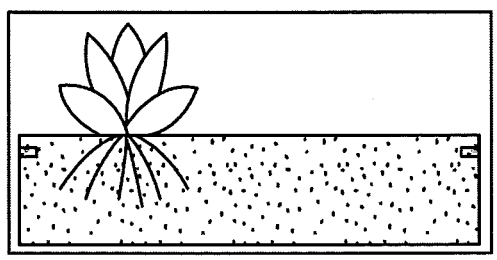
FIG. 7 illustrates the Fog Feed Technique (FFT)
Figure 8:
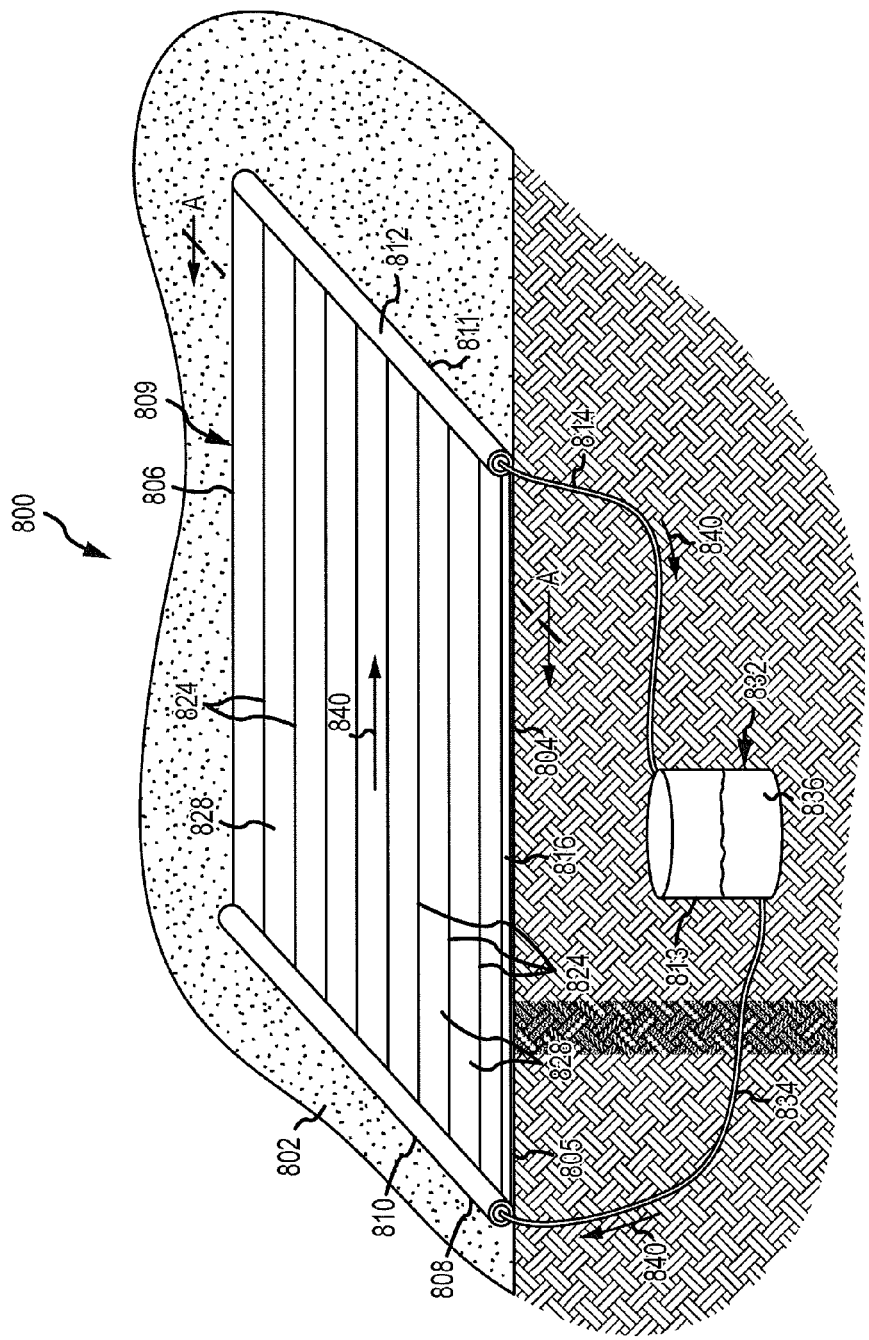
FIG. 8 illustrates a view of the irrigation system in a field in accordance with embodiments of the present invention.

With reference to FIGS. 8-15, various exemplary embodiments of the disclosed irrigation system 800 invention are illustrated. FIG. 8 illustrates a view of the irrigation system 800 in a field 802. This view shows the hydroponic system without the top layer or additional layers which may be added on or to the top of the irrigation system 800. The irrigation system 800 includes a fluid distribution structure 809 that comprises a barrier layer 804, located beneath a hydrophilic layer 816. In some embodiments, the fluid distribution structure 809 may further comprise a plurality of channels 828 formed between welds or seals 824 within the fluid distribution structure 809. The fluid distribution structure 809 may be placed between an optional fluid supply tube 808 and an optional fluid drainage tube 812. The fluid supply tube 808 may be located on a first or supply end 810 of the fluid distribution structure 809 and the fluid drainage tube 812 may be located on a second or drainage end 811 of the fluid distribution structure 809. The first end 810 of the fluid distribution structure 809 may be at an elevation higher than the elevation of the second side of the fluid distribution structure 802. More particularly, for each point along the supply tube 808, a corresponding point along the drainage tube 812 is at a lower elevation. For example, for a system 800 with channels 828, a first end of a channel 828 adjacent the supply tube 808 is at a higher elevation than the second end of the channel 828 adjacent the drainage tube 812. The fluid distribution structure may further comprise a first side 805 and a second side 806 that together with the first and second ends 810, 811 define the area of the fluid distribution structure 809.

In some embodiments, a fluid supply system 832 may be included. The fluid supply system 832 supplies an irrigation fluid or aqueous solution, hereinafter referred to as fluid 836 to the fluid supply tube 808 through a supply line 834. The supply line 834 may be connected to a fluid storage tank 813. In some embodiments, a recirculating drainage line 814 may be connected to the drainage tube 812 to recirculate excess fluid collected by the fluid drainage tube 812 to the fluid storage tank 813 and back to the supply line 811. In accordance with at least some embodiments of the invention, the fluid supply system 832 may include a pump. Accordingly, a fluid supply system 832 can operate to supply irrigation fluid 836 to a first end 810 of the fluid distribution structure 809 from the fluid storage tank 813 through the fluid supply tube 808 and the supply line 811. That fluid then is drawn through the hydroponic layer 816, along the channels 828, to the second end 811 of the fluid distribution structure 809. Any fluid not absorbed or taken up while moving across the fluid distribution system 809 is received by the drainage tube 812 and returned to the fluid reservoir 813 by the recirculating drainage line 814. Arrows 840 show the general direction of travel of fluid 836 through the irrigation system 800. Fluid in the fluid storage tank 813 may be monitored an adjusted as desired by an operator or controller. In some embodiments, fluid in the fluid storage tank may be disposed of.

Figure 9:
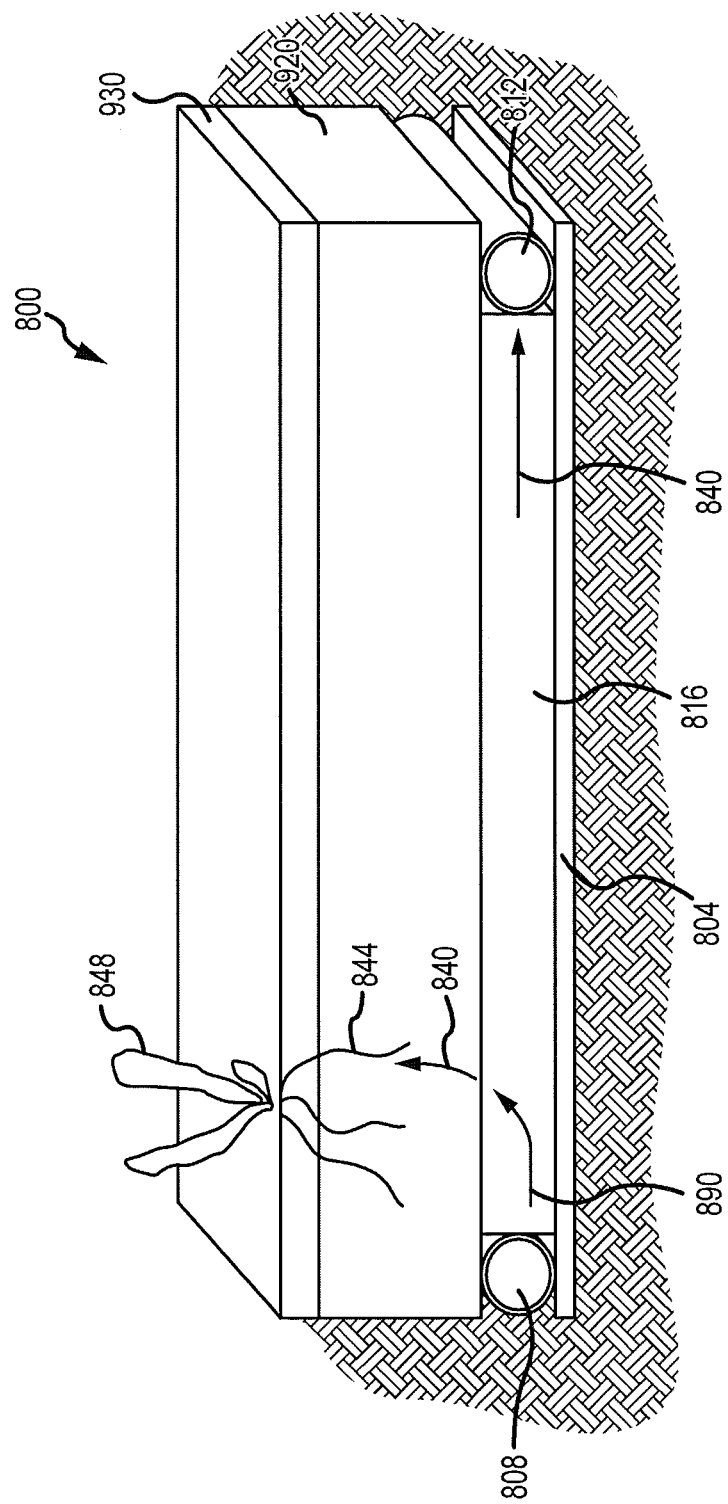
FIG. 9 illustrates a perspective view of an irrigation system in accordance with embodiments of the present invention.

FIG. 9 is a perspective view of a fluid distribution structure 809 of an irrigation system 800, with a top layer 920 and an additional layer 930. The irrigation system 800 comprises several components. The aqueous solution barrier layer 804 prevents fluid, such as irrigation fluid 836 or rain, from reaching the ground under the irrigation system 800. The barrier layer 804 may be made from any suitable material that prevents or substantially prevents fluid from reaching the ground below the irrigation system 800 thereby reducing fluid loss. By way of non-limiting example, the barrier layer 804 may be polyethylene, polypropylene, polyester, nylon, or the like or combinations of these materials. There may be several iterations of the barrier layer 804 for redundancy in the irrigation system 800. Furthermore, the barrier layer 804 may be any suitable thickness. In some embodiments, the barrier layer 804 is a single layer of material to reduce the weight of the irrigation system 800. Alternatively, the barrier layer 804 may comprise a laminated structure. In some embodiments, the barrier layer 804 is parallel with the ground below the system. In other embodiments, the barrier layer 804 has substantially the same shape as the channels and is joined with the other layers of the system through a seal.

An optional fluid supply tube 808 provides fluid to the irrigation system 800. The fluid supply tube 808 may be any suitable shape or size able to provide fluid to the irrigation system. By way of non-limiting example, the fluid supply tube 808 may be a soaker tube, a hose, a drip tube or the like. The fluid supply tube 808 may be any suitable material, including polymeric materials, rubber, metals or a combination of these materials. The fluid 836 may be plain water, or may include supplements such as nutrients and/or pesticides. The fluid 836 provided to the fluid supply tube 808 can also be recycled from drained fluid in the irrigation system 800 that has been collected by a drainage tube 812. The nutrients may comprise at least one of C, H, O, N, P, K, Ca, Mg, Z, Zn, Cu, Fe, Mn, B, Mo and Cl. The fluid 836 may be continuously supplied to the irrigation system 800, or may be controlled. The fluid supply tube 808 may be located at several locations in the irrigation system 800. In some embodiments, the fluid supply tube 808 is located along an edge and/or at a high point in the irrigation system 800, in other words, if the irrigation system 800 is located on a gradient of a field, the fluid supply tube 808 would be at an elevated point on the field such that the fluid in the fluid supply tube 808 may pass through the irrigation system 800 using gravity. Furthermore, the fluid supply tube may be partially wrapped in the hydrophilic layer and/or the barrier layer.

An optional fluid drainage tube 812 collects excess fluid 836 or contaminated fluid from the irrigation system 800. The fluid drainage tube 812 may be any suitable shape or size, may be any suitable material, and may be flexible or rigid. For example, the fluid drainage tube 812 may be a perforated pipe or hose. The fluid drainage tube 812 may direct fluid back to the fluid supply tube 808, to another area on the field or to a storage container for recycling the fluid or disposal. Furthermore, the fluid drainage tube may be partially wrapped in the hydrophilic layer and/or the barrier layer.

Hydrophilic layer 816 is also included in the irrigation system 800. Hydrophilic layer 816 provides a means for the roots to gain access to the fluid in the irrigation system 800. Fluid 836 in the irrigation system 800 is able to wick or flow through the hydrophilic layer 816 and provide fluid to the roots 844 of plants 848 comprising all or part of the additional layer 830 that extend into the top layer 820. In some embodiments, the hydrophilic layer 816 is a hydrophilic polymer. The hydrophilic layer 816 of the irrigation system provides fluid 836 to the top layer 920 of the system. The flow of fluid 836 in the system is depicted by arrows 840. The top layer 920 may, for example, include sand, seeds, soil, roots, gravel, small pebbles, rocks, or the like, or combinations of these materials, and generally has a particle size larger than the gaps in the hydrophilic layer 816 so as to not clog the hydrophilic layer 816. The top layer 920 may reduce foreign invaders such as weeds and infections from establishing themselves in the hydroponic layer 816. The top layer 920 may also be used to reduce the amount of evaporation and moisture loss from the irrigation system. Additionally, the materials of the top layer 920 may be pebbles, rocks or gravel that are light in color so that they reflect light. In certain embodiments, the pebbles, rocks or gravel may be perlite. The top layer 920 may also include a cross-polymer material. Additional layers 930, which can comprise grass or other plants 848 may be present above or integrated with the top layer 920.

Figure 10:
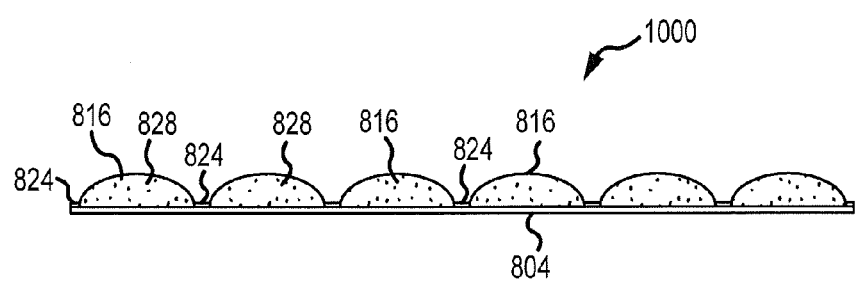
FIG. 10 is a cross-section of an irrigation system in accordance with embodiments of the present invention.

FIG. 10 depicts a fluid distribution structure 809 of an embodiment of the irrigation system 800 in a cross-section taken along section line A-A of FIG. 8. The barrier layer 804 substantially prevents fluid 832 from reaching the ground or other supporting structure beneath the irrigation system 800. In the illustrated embodiment, the hydrophilic layer 816 comprises a densely compacted material that allows fluid to flow and wick through the hydrophilic layer 816. The top portion of the hydrophilic layer 816 may be treated by heating or scorching the top portion of the hydrophilic layer 816 so that it allows for flow of the fluid and provides fluid to roots, but also acts as a root guard substantially preventing the roots from penetrating and damaging other components of the irrigation system 800. The hydrophilic layer 816 further comprises at least one, and preferably a plurality of channels 828. The channels 828 may be substantially the same size, or may vary in size as compared to each other. The channels 828 may be created by sealing or joining the hydrophilic material 816 to the barrier layer 804 with seals 824. The seals 824 may be made by any suitable means, for example by heat sealing, heat mold, gluing, embossing, welding, bonding, adhesively, stitching, or a combination thereof. The channels 828 are believed to provide for or to promote an even distribution of fluid across the irrigation system 800. Additionally, if there are dips in the field where the irrigation system 800 is used, the channels 828 provide for fluid to follow along the channel 828 in a directional flow so not to be impeded by dips or bumps along the field.

Figure 11:
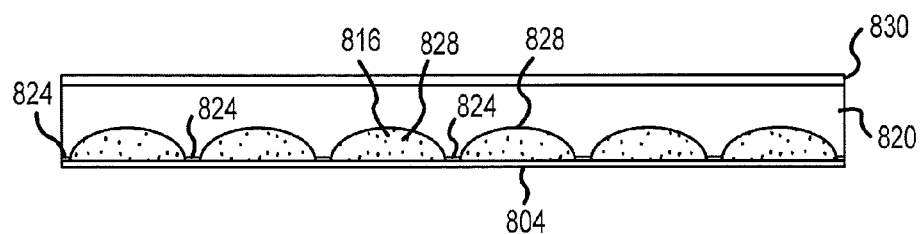
FIG. 11 is a cross-section of an irrigation system in accordance with embodiments of the present invention.

FIG. 11 illustrates a cross-sectional view of an irrigation system 800 in accordance with other embodiments of the disclosed invention. The barrier layer 804 substantially prevents fluid from reaching the ground below the irrigation system 800. The hydrophilic layer 816 provides for the distribution of fluid through the irrigation system 800. The hydrophilic layer 816 in this embodiment is a densely compacted material. Seals 824 create a plurality of channels 828 across the fluid distribution structure 809 of the irrigation system 800. The top layer 920 comes into contact with and generally covers the hydrophilic layer 816. An optional additional layer 930 can be plants, sand, rocks or the like. Fluid passes through the top layer 920 which may contain roots associated with plants included in the additional layer 930. As examples, the additional layer 930 may include grass, wheat, vegetables, fruit, flowers, herbs, rice or the like.

Figure 12:
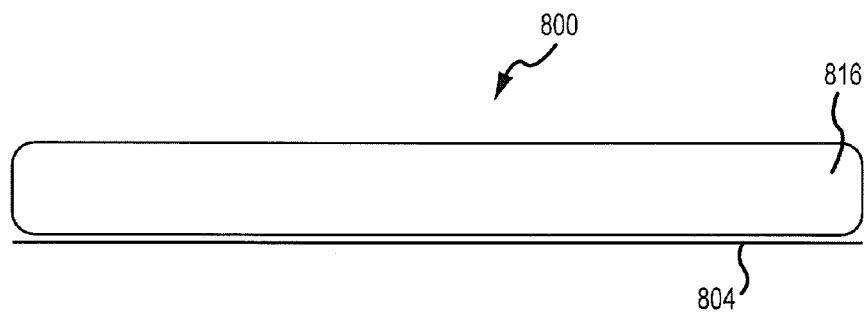
FIG. 12 is a cross-section of an irrigation system in accordance with embodiments of the present invention.

FIG. 12 illustrates a cross-sectional view of an embodiment of the irrigation system 800 in accordance with still other embodiments of the disclosed invention. The barrier layer 804 substantially prevents fluid from reaching the ground below the irrigation system 800. The hydrophilic layer 816 in such embodiments does not include a plurality of channels. In particular, in certain situations, such as where the field has a slight to little slope, the hydrophilic layer can adequately distribute fluid without channels. The hydrophilic layer 816 effectively distributes water due to the wicking nature of the hydrophilic layer 816.

Figure 13:
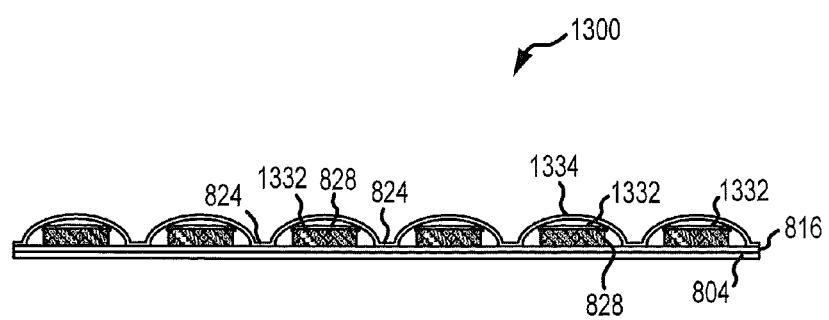
FIG. 13 is a cross-section of an irrigation system in accordance with embodiments of the present invention.

FIG. 13 illustrates a fluid distribution structure 809 of yet another embodiment of the irrigation system 800 in a cross-section taken along section line A-A of FIG. 8. In this embodiment, the irrigation system 800 comprises a four layer or component fluid distribution structure 809. The four components include a barrier layer 804, a hydrophilic layer 816, non-woven elements 1332, and a filter layer 1334. The barrier layer 804 substantially prevents the fluid from reaching the ground below. The hydrophilic layer 816 provides fluid to the system and assists in wicking fluid through the system. The non-woven elements 1332 fit within channels 828 formed between portions of the hydrophilic layer 816 and a filter layer 1334. Each non-woven element 1332 may be the length of a channel 828 receiving the non-woven element 1332 or a plurality of non-woven elements 1332 may be fitted into a receiving channel 828. A non-woven element 1332 provides volume to the channel 828 and assists in draining fluid through the system. The non-woven elements 1332 may be any suitable material and any suitable shape. In some embodiments, the material is a hydrophilic material, though a hydrophobic material is also suitable. The material may be a polymer, rubber, metal, wood or the like. The filter layer 1334 is the top layer of the fluid distribution structure 809 of this embodiment. The filter layer 1334 may be the same material as the hydrophilic material of the hydrophilic layer. Alternatively or in addition, the filter layer 1334 may be a root guard material to prevent roots from penetrating the irrigation system 800. The filter 1334 also prevents dirt, sand, rocks and the like from penetrating the irrigation system 800. The filter layer 1334 may be any suitable shape or size. In some embodiments, the filter layer 1334 is a hydroscopic polyester fiber woven or a non-woven material. Channels 828 are created with seals 824 across the fluid distribution structure 809. In particular, in at least some embodiments, the channels 828 are formed by joining the filter layer to the hydroponic layer 816 and/or the barrier layer 804 by seals 824. In a deployed state, the barrier layer 804 is generally parallel to the ground below it and is connected to the remaining layers of the system at points intermittently through the system or along a portion of the channel 1328.

Figure 14:
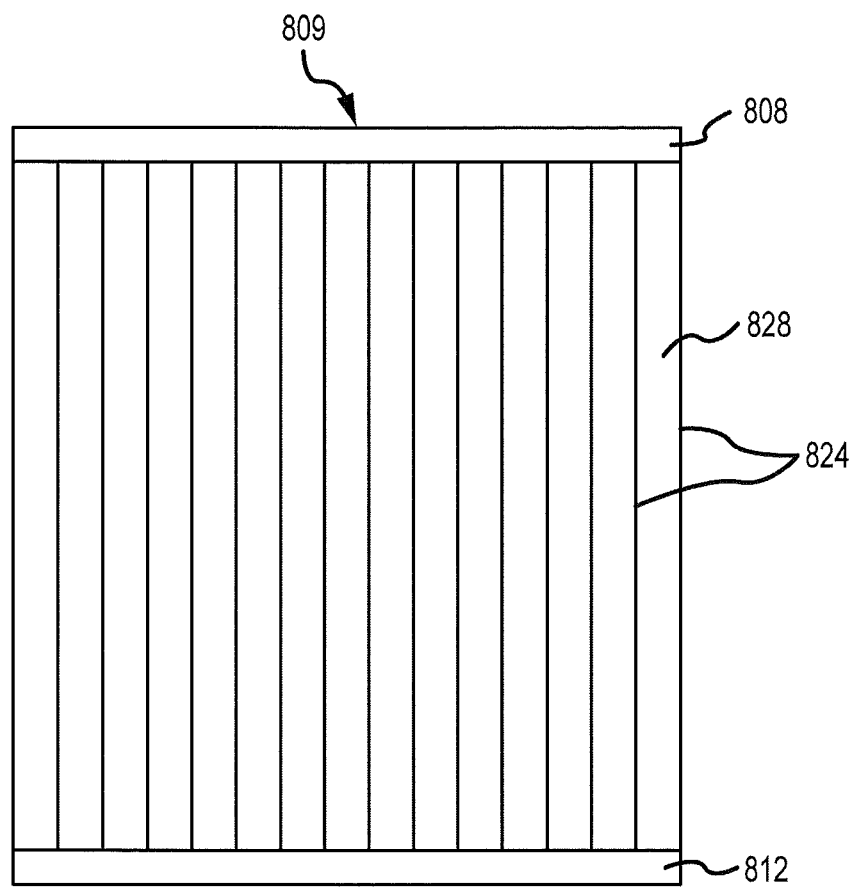
FIG. 14 illustrates a top plan view of an irrigation system in accordance with embodiments of the present invention.

FIG. 14 illustrates a top plan view of a fluid distribution structure 809 of a irrigation system 800 in accordance with embodiments of the present invention. As shown, parallel channels 828 extend from a fluid supply tube 808 to a fluid drainage tube 812. Fluid from the fluid supply tube 808 passes along the channels 828, and excess fluid may be drained with the fluid drainage tube 812.

Figure 15:
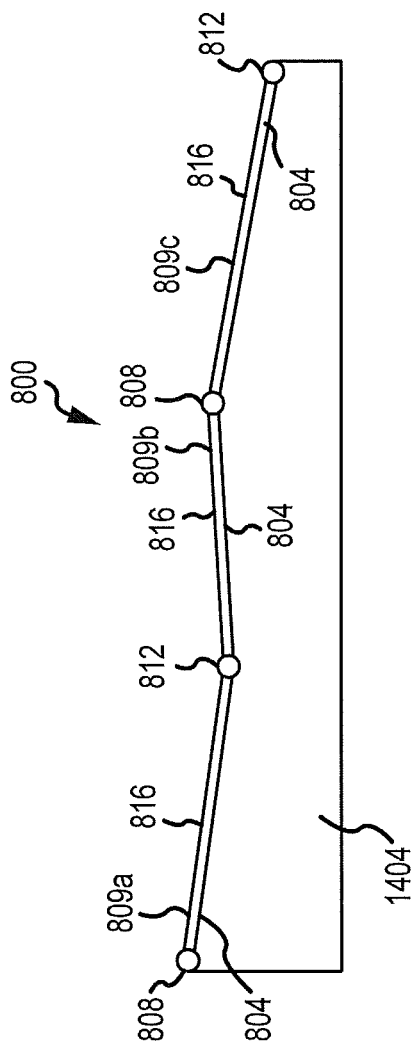
FIG. 15 illustrates an irrigation system incorporating a plurality of fluid distribution structures in accordance with embodiments of the present invention.

FIG. 15 illustrates an irrigation system 800 in accordance with embodiments of the present invention that includes a plurality of fluid distribution structures 809. Moreover, the system 800 is shown in cross-section, installed on a section of Earth 1404. More particularly, three fluid distribution structures 809a, 809b and 809c are shown. Each fluid distribution structure 809a-c includes a barrier layer 804 and a hydrophilic layer 816. Moreover, the fluid distribution structures 809 may or may not include channels. The supply tubes 808 are arrayed along contour lines or high points over the section of Earth 1404 on which the system 800 is deployed. Drainage tubes 812 are arrayed along low points or depressions in the Earth 1404. As shown, fluid distribution structures 809 can share supply tubes 808 and/or drainage tubes 812. In addition, a plurality of fluid distribution structures 809 can be located adjacent one another to cover a large section of Earth 1404 or a large field.

Figure 16:
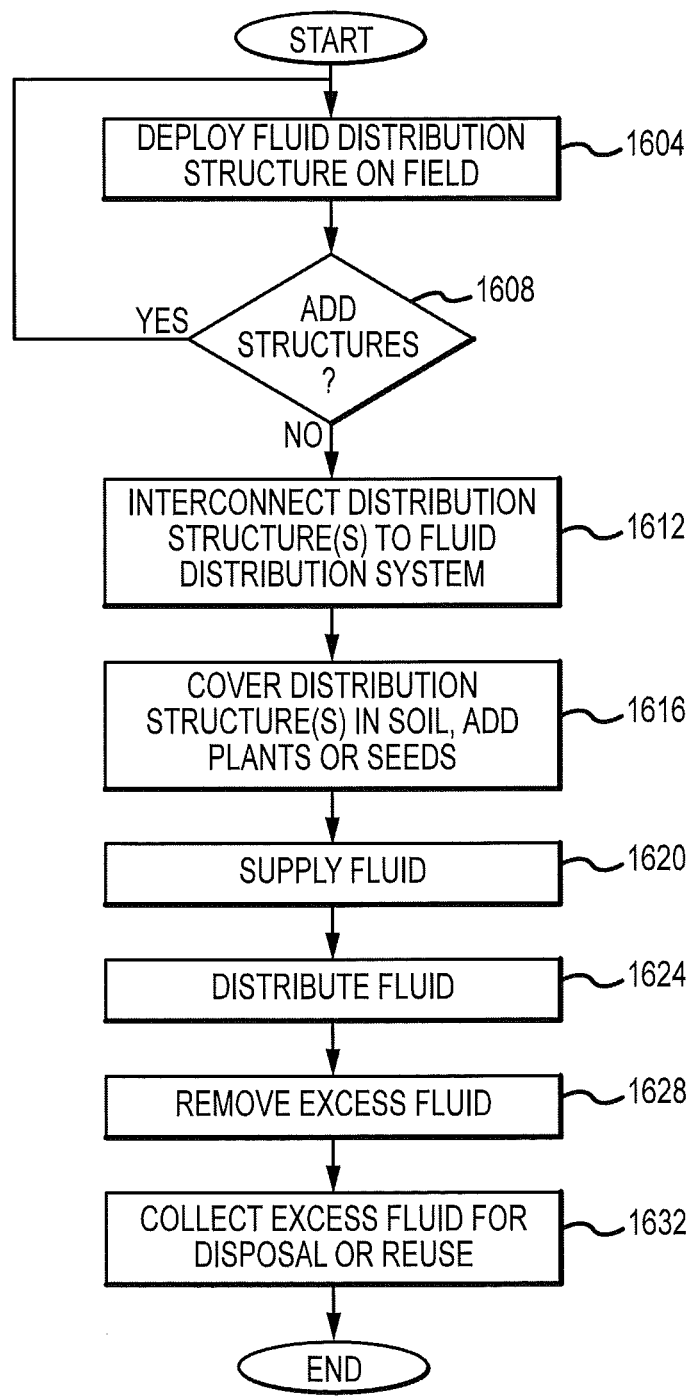
FIG. 16 illustrates aspects of the operation of an irrigation system in accordance with embodiments of the present invention.

FIG. 16 illustrates aspects of the operation of an irrigation system 800 in accordance with embodiments of the present invention. Initially, a fluid distribution structure 809 is deployed over a selected area of a field (step 1604). More particularly, the fluid distribution structure 809 can be positioned such that any point along a first end 810 is at a higher elevation than any point along a second end 811. At step 1608, a determination may be made as to whether additional fluid distribution structures 809 are required in order to provide the desired coverage of the field. If additional fluid distribution structures 809 are required, they can be positioned such that they abut one or more other fluid distribution structures 809. Once it has been determined that no additional fluid distribution structures 809 are required, the in place fluid distribution structures 809 may be interconnected to an associated fluid distribution system 832 (step 1612). Where the in place fluid distribution structures 809 each include an integrated supply tube 808 and drainage tube 812, those tubes can be interconnected to the remainder of the fluid distribution system 832. Alternatively, the supply tubes 808 and drainage tubes 812 can also be positioned. At step 1616, the in place fluid distribution structure or structures 809 can be covered by a top layer 920, such as soil or another growth medium, and an additional layer 930, for example comprising individual plants, sod, seeds or other material, can be added. Fluid can then be supplied to the supply tubes 808 (step 1620). By supplying fluid to the supply tubes along one end of the fluid distribution structures 809, the hydrophilic material 816 can be saturated. As can be appreciated by one of skill in the art after consideration of the present disclosure, the hydrophilic material 816 will draw the fluid from the end 810 associated with the supply tube 808, towards the opposite end 811, associated with the drainage tube 812. Moreover, by distributing the fluid across the fluid distribution structure 809, that fluid will be made available to soil included in a top layer 920 overlaying the fluid distribution structure 809 and to the roots 848 of plants 844 included in or comprising an additional layer 930 (step 1624). In accordance with embodiments of the present invention, the wicking action of the hydrophilic material 816 is believed to promote aeration of overlaying soil included in a top layer 920. In particular, as fluid is drawn across the fluid distribution structure 809, that fluid is replaced by air if the supply of fluid is reduced or discontinued. Moreover, in accordance with embodiments that include channels 828 having a volume formed in connection with a non-woven element 1332 and a filter layer 1334, the volume available for fluid and air to pass beneath the top layer 920 is increased. Therefore, embodiments of the present invention can provide an aeration function. Excess fluid can be removed using a drainage tube 812 (step 1628). The fluid collected by the drainage tube can be collected for disposal or reuse.

An exemplary way to deliver the irrigation system to the field is by the system into large rolls. In certain embodiments, the irrigation system is connected a second irrigation system such that there is between the systems. In some embodiments, multiple systems may overlap allowing for multiple systems to be joined together and sealed on site or to allow for the user to customize the system to the size and shape of the field. The edges of the systems may be sealed using any suitable means, including but not limited to, taping, gluing, folding, application of a force or the like.

In certain embodiments, the system is applied to a relatively smooth and relatively level ground. Large bumps above the surface of the ground may cause dry spots in the system. Alternatively, large bumps on the surface of the ground that indent may lead to stagnation of the aqueous fluid. However, it is understood that because the fluid may wick through the hydrophilic layer of the system, that fluid will be able to move through the system regardless of large bumps on the surface of the ground.

Another advantage of the disclosed irrigation system 800 is that it allows for fluids to pass through the top layer of the system and assist in drainage of a field. This drainage ability of the irrigation system is beneficial if flooding or excess fluid accumulates above the irrigation system. Fluid passes through the top surface and through the irrigation system. Once in the irrigation system, the fluid may pass through the system and drain.

In another embodiment, the system is applied to a field with an overall gradient. The gradient may be slight or in some embodiments, is very large. The gradient may allow for the aqueous solution to pass through the roots, while preventing stagnation of the aqueous fluid. In certain embodiments, the gradient may be used to reclaim aqueous solution and rain water in accumulation tanks located at several locations in the system. The accumulation tanks allow for recovery of the unused aqueous solution and conservation of the aqueous solution. The drainage system of the irrigation system also allows for contaminates, such as pesticides or fertilizers that were directly applied or rinsed off plants when it comes into contact with a fluid, to be collected through the drainage system.

In another embodiment, the system can be used to reclaim land from deteriorated soil erosion or landslides. Because the system is able to grow greenery, such as grass and shrubs, the system may have a more natural look while promoting growth on the land and preventing further erosion of the land.

The foregoing discussion of the disclosure has been presented for purposes of illustration and description. Further, the description is not intended to limit the invention to the form disclosed herein. Consequently, variations and modifications commensurate with the above teachings within the skill or knowledge of the relevant art are within the scope of the present disclosure. The embodiments described herein above are further intended to explain the best mode presently known of practicing the disclosure and to enable others skilled in the art to utilize the invention in such or in other embodiments and with the various modifications required by the particular application or use of the invention. It is intended that the appended claims be construed to include alternative embodiments to the extent permitted by the prior art.

What is claimed is:

1. A system for delivering a fluid to a field comprising:
a fluid distribution structure, including:
a barrier layer, wherein the barrier layer prevents fluid from reaching a surface under the system;
a volume providing layer, wherein portions of the volume providing layer contact the barrier layer, and wherein the volume providing layer provides volume to the fluid distribution structure;
a filter layer, wherein the filter layer is formed on a surface of the volume providing layer opposite a surface of the volume providing layer that is in contact with the barrier layer, and wherein the filter layer prevents soil from reaching the volume providing layer;
a plurality of channels, wherein the volume providing layer and the plurality of channels extend between a first end of the fluid distribution structure and a second end of the fluid distribution structure, wherein each channel of the plurality of channels are parallel to each other, and wherein the plurality of channels include a volume that is defined between the barrier layer and the filter layer; and
a non-woven material inside at least a portion of the volume that is defined between the barrier layer and the filter layer.

2. The system of claim 1, wherein the volume providing layer is a non-woven material.

3. The system of claim 1 wherein the filter layer is a modification of the volume providing layer.

4. The system of claim 1, wherein the volume providing layer is a hydrophilic material.

5. The system of claim 4, further comprising:
a root guard layer formed by treating a top portion of the hydrophilic material to form the filter layer; and
a plurality of seals, wherein the plurality of seals form the plurality of channels, and wherein the plurality of seals fuses together the barrier layer and the root guard.

6. The system of claim 1, wherein the barrier layer is selected from the group consisting of a polyethylene, a polypropylene, a polyester, and a nylon.

7. The system of claim 1, further comprising a fluid, wherein the fluid comprises at least one of C, H, 0, N, P, K, Ca, Mg, S, Zn, Cu, Fe, Mn, B, Mo and Cl.

8. The system of claim 1, where the system provides the fluid to a crop, wherein the crop is selected from the group consisting essentially of at least one of a vegetable, a fruit, a flower, a herb, a grass, a wheat, and a rice.

9. The system of claim 1, wherein the system is applied to a field with a gradient.

10. The system of claim 1, further comprising a fluid supply tube.

11. The system of claim 1, further comprising a fluid drainage tube.

12. The system of claim 1, further comprising at least one storage tank.

13. A system for delivering a fluid to a field, comprising:
   a fluid distribution structure, including:
   a barrier layer, wherein the barrier layer prevents fluid from reaching a surface under the system;
   a volume providing layer, wherein the volume providing layer provides volume to at least portions of the fluid distribution system;
   a filter layer; and
   a plurality of channels, wherein each channel in the plurality of channels includes a portion of the barrier layer as a first surface and a portion of the filter layer as a second surface, wherein for each of the channels a surface area of the portion of the barrier layer is less than a surface area of the portion of the filter layer, and wherein a volume of each channel between the portion of the barrier layer and the portion of the filter layer is at least partially occupied by a portion of the volume providing layer.

14. The system of claim 1, further comprising:
   a fluid supply tube; and
   a fluid drainage tube, wherein the plurality of channels extends between the fluid supply tube and the fluid drainage tube.

15. The system of claim 1, further comprising a plurality of seals, wherein the plurality of seals form the plurality of channels, and wherein the plurality of seals are formed using a method selected from the group consisting of heat sealing, heat mold, gluing, embossing, welding, bonding, adhesively, stitching, and a combination thereof.

16. The system of claim 15, wherein the plurality of seals fuses together the barrier layer, the volume providing layer and the filter layer.

17. A method for delivering fluid to a field, comprising:
   providing a fluid distribution structure, wherein the fluid distribution structure includes:
   a barrier layer, wherein the barrier layer prevents fluid from reaching a surface under the system;
   a volume providing layer, wherein at least a portion of the volume providing layer contacts the barrier layer, and wherein the volume providing layer provides volume to the fluid distribution structure,
   a filter layer, wherein the filter layer is formed on a surface of the volume providing layer opposite a surface of the volume providing layer that is in contact with the barrier layer, and wherein the filter layer prevents soil from reaching the volume providing layer;
   a plurality of channels, wherein the volume providing layer and the plurality of channels extend between a first side of the fluid distribution structure and a second side of the fluid distribution structure, wherein each channel of the plurality of channels are parallel to each other, and wherein the plurality of channels include a volume that is defined between the barrier layer and the filter layer;
   a non-woven material inside at least a portion of the volume that is defined between the barrier layer and the filter layer; and
   providing a fluid to the first side of the fluid distribution structure, wherein the fluid flows within the volume providing layer, and wherein the volume providing layer provides volume to the fluid distribution structure.

18. The method of claim 17, further comprising providing air to the fluid distribution structure.

19. The method of claim 17, wherein the fluid distribution structure further comprises a drain on a second side of the fluid distribution structure.

20. The method of claim 19, wherein the fluid is removed from the fluid distribution structure through the drain.

21. The system of claim 13, wherein the volume providing layer is a non-woven material.

22. The system of claim 13, wherein the each channel includes first and second parallel sides.

23. The system of claim 22, wherein each of the first and second parallel sides is formed from a seal between the barrier layer and the filter layer.

24. The system of claim 13, wherein the filter layer is formed on a top surface of the volume providing layer.

25. The system of claim 13, wherein the volume providing layer is a hydrophilic material.

26. The system of claim 13, wherein the barrier layer is selected from the group consisting of a polyethylene, a polypropylene, a polyester, and a nylon.

* * * * *